United States Patent Office 3,788,981
Patented Jan. 29, 1974

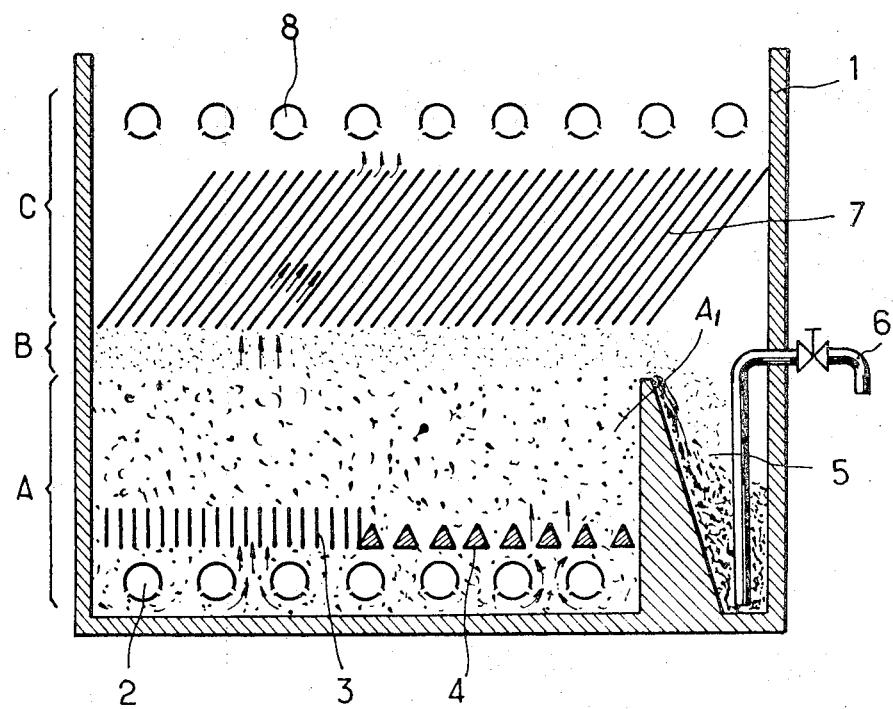

3,788,981
METHOD AND APPARATUS FOR TREATING LIQUIDS
Yves Robert Richard, Marly le Roi, and Jean Marcel Mignot, Meudon, France, assignors to Degremont Societe Generale d'Epuration et d'Assainissement, Rueil Malmaison, France
Filed Mar. 30, 1972, Ser. No. 239,470
Claims priority, application France, Apr. 2, 1971, 7111693
Int. Cl. B01d 37/04
U.S. Cl. 210—20
7 Claims

ABSTRACT OF THE DISCLOSURE

The method and apparatus of this invention make it possible to increase to 6 to 10 m./h. the upward flow rate of liquid to be treated in a single vessel according to the sludge-bed decantation process. The liquid is introduced homogeneously at the bottom of the vessel, so that it rises in lamellar fashion through the sludge and then through a separating section followed by an overlying finishing area comprising clusters of tubes, grids, grates, plates, for separating the entrained particles from the treated liquid.

BACKGROUND OF THE INVENTION

The present invention relates to methods of and apparatus for treating liquids in general but more particularly water. The methods and apparatus referred to herein are essentially of the sludge decantation type, consisting primarily in utilizing a vessel comprising two superposed portions, i.e. a flocculating portion and a decanting portion, the method of this invention being applicable to the treatment of liquids of all types, especially water.

It is well known in the field of liquid treatment that in the so-called sludge bed decantation processes the liquid to be treated, notably water, previous addition of suitable additives, such as coagulating agents, flocculating agents, pH correctors, etc., circulates upwardly through the previously formed sludge bed or layer, this sludge promoting the incipient coagulation by agglomerating and retaining by itself the precipitate or deposit thus formed, as well as the fine particles of materials in suspension in the liquid to be treated.

The liquid flows upwardly through the sludge layer at a certain rate. Advantageously, this rate should be as high as possible but it is usually retarded by two factors, on the one hand the sludge cohesion depending partly on the quality of the liquid to be treated, and on the other hand the desired quality of the decanted liquid, which is a function of the subsequent treatment, notably the filtration, contemplated for this liquid.

In certain conventional methods of decanting liquids through a sludge bed or layer the liquid to be treated is fed to the apparatus under uniform input conditions and the liquid circulating through the sludge layer rapidly tends to become localized in certain priviledged areas in which preferential passages also called "leaks" or "gaps" devolp, wherein the liquid is not in actual contact with the sludge bed. To improve the homogeneity of the treatment, means for mechanically stirring the treated liquid are sometimes resorted to, but this is attended in most instances by a destruction of the esesentially fragile flock due to repeated shock with mechanical members and also to the turbulence thus created. A satisfactory cohesion of the sludge and a suitable amount of decanted water cannot be obtained unless the upward flow rate remains below 3 to 4 m./h. In this case the decanting surface areas are very considerably in excess of the necessary theoretical surface areas. In the whole, these systems have a relatively low efficiency.

In other methods the sludge-bed decantation is improved in that the liquid to be treated is fed discontinuously, with high-output but short periods alternating regularly with relatively long "inoperative" periods; thus, the liquid is distributed uniformly throughout the lower portion of the decanting vessel. The sludge layer regularly "pulsated" from bottom to top during the high-output phases is kept in an expanded condition homogeneously throughout its mass, whereby an intimate contact between the liquid and the sludge is obtained. The liquid rises along substantially vertical paths. Due to the proper utilization of the decanting volume, upward flow rates of the order of 4 to 5 m./h. are obtained, thus yielding very satisfactory treatment results.

However, the upward flow rate is limited to these values of 4 to 5 m./h. due to the risk of destroying the sludge cohesion, if it is desired to preserve a satisfactory quality of the treated liquid. Beyond this limit, massive, sudden upflows of sludge are observed and may even lead to a total destruction of the sludge bed. Moreover, since the liquid to be treated is supplied continuously, local turbulence developes and impairs the sludge cohesion.

SUMMARY OF THE INVENTION

It is an essential object of this invention to avoid the various inconveniences set forth hereinabove and to permit considerably higher upward flow rates, of the order of 6 to 10 m./h., given an equivalent quality of decanted liquid, to be attained without breaking the sludge cohesion.

This invention provides to this end an improved sludge-type decantation method adapted to be carried out in an apparatus comprising a single vessel or enclosure divided into two superposed portions, i.e. a portion in which the liquid to be treated, possibly containing reagents capable of flocculating the liquid, is kept in contact with a sludge bed, and another portion in which the liquid decantation takes place. This method is characterized in that the liquid to be treated is introduced into the bottom of the apparatus, homogeneously and throughout the area of said bottom, then caused to perform a lamellar flow through the sludge bed in order to preserve the sludge bed cohesion, and that the liquid, in the decanting portion, is again caused to flow according to a lamellar flow characteristic through means adapted to separate the particles carried along by the liquid outside the sludge bed.

BRIEF DESCRIPTION OF THE DRAWINGS

The method of this invention is adapted to be carried out by using an apparatus of the type described hereinafter with reference to the single figure of the attached drawing. Of course, this apparatus constitutes merely a specific embodiment of the invention which is given by way of illustration and to which various modifications and variations may be brought without departing the basic principles of the invention as set forth in the appended claims.

DETAILED DESCRIPTION OF THE INVENTION

This apparatus comprises a single container vessel or other enclosure into which the liquid to be treated is introduced near the bottom. Although water is referred to primarily as the liquid to be treated, it will readily occur to those conversant with the art that other liquids may be processed according to this invention by using the same method and apparatus. During the treatment three superposed portions or areas shown diagrammatically in the drawing develop, namely (from the bottom upwardly): a treatment area A containing the sludge bed $A_1$, a so-called "primary" area B in which the liquid separates from the sludge, and a decanting area C.

The liquid to be treated is introduced into the lower portion of the container 1 by means of distributor members 2 arranged with a view to ensure a homogeneous supply of liquid throughout the surface area of the container.

The liquid is supplied at a constant rate to the container 1, but the output in fact is variable, due for example to pulsations applied to one fraction of the liquid input, in order to preserve the homogeneity of the sludge bed throughout the height thereof.

The liquid to be treated emerging from the feed members 2 is exposed to the action of means adapted to transform its turbulent flow into a lamellar flow comprising parallel liquid streams or streamlets. These means may be of any suitable and known type, such as a set of fins or a grid 3, gratings 4, or tubular structures, disposed above the feed members 2 and having adequate cross-sectional and vertical dimensions. By using these means according to this invention the distribution of the liquid through the sludge bed remains homogeneous notwithstanding the relatively high upward flow rates attained, due to the absence of the formation of the turbulence. The sludge bed $A_1$ remains efficient throughout its height and considerably higher upward flow rates may be used for the liquid to be treated, without any risk of impairing the sludge cohesion.

The greater part of the flocculated sludge is removed through known means such as a liquid sludge separator 5 and sludge extractor 6. Above this liquid sludge separation area B, i.e. above the sludge bed $A_1$, a so-called "finishing" member 7 comprising tubes, plates or cloth sheets disposed obliquely at an angle of 30° to 70° is provided vertically above the bath surface and retained by steel ropes, a supporting platform or other equivalent and known means. Of course, the height of the elements constituting the finishing member 7 as well as the gap between these elements vary as a function of the liquid to be treated. In any case, the fluid flow through these plates, tubes or the like must constantly remain of lamellar character. Due to the provision of this finishing member it is possible to stabilize the sludge which, due to the considerable upward flow rate attained within the sludge bed, would tend naturally, in case of misadjustment, to lose its cohesion and therefore compensate such possible want of cohesion and protract the decantation up to an extreme degree. The decantation itself is improved very considerably and the flocculated sludge having passed through the separating, primary area B is retained in, or "trapped" by, this device.

The decanted liquid is then discharged through suitable means 8 of known type disposed in the upper portion of the container or vessel 1.

With this method and apparatus the liquid to be treated can travel from the flocculation area A to the decantation area C without any change in its flow rate, the latter attaining particularly high values, up to 10 m./h. for example, for a considerable quantity of decanted liquid.

The decantation output is improved by 40 to 100%. At a temperature of, say, 18°, for example, in the apparatus according to the present invention, the liquid to be treated may flow upwardly at a rate as high as 9 m./h. with a final turbidity of 3.2 international Jackson units, in contrast to a conventional apparatus wherein, given the same final turbidity and the same quality of the liquid to be treated, the upward flow rate is only 5 m./h.

In addition to this considerable advantage in comparison with prior art techniques in which the maximum upward flow rate seldom exceeds 4 to 5 m./h., the present invention is advantageous in that, given an equal upward flow rate, it yields a decanted liquid of considerably lower clogging capacity, whereby filtration rates improved by 40 to 100% with respect to those obtained with a conventional decanting apparatus, are obtained with a same useful life of the filter means. The present invention is also advantageous in that it makes it possible to cope more rapidly and easily, through suitable adjustments, with sudden variations in the quality of the input liquid delivered to the container 1, without any risk of causing a sudden disintegration of the sludge bed.

Moreover, the method of this invention makes it possible to use in an apparatus having a relatively moderate floor area, given an equivalent throughput, in comparison with conventional apparatus.

Finally, by applying the method of this invention to a normal decantation it is possible to increase considerably the decantation output without having to construct another decanting apparatus.

Of course, this invention should not be construed as being strictly limited to the specific embodiment and exemplary constructional details given herein. Again, as already pointed out in the foregoing, other liquids may be treated therewith without departing from the scope of the invention.

What is claimed is:

1. An apparatus for treating liquids, such as water, through decantation by means of a sludge bed, said apparatus comprising:

a vessel having therein a sludge bed;

a plurality of feed means parallelly arranged in a horizontal plane adjacent the bottom of said vessel for feeding the liquid to be treated into said vessel and through said sludge bed;

a plurality of means positioned in said sludge bed above said feed means for imparting to said liquid a uniform distribution and a lamellar flow upwardly through said sludge bed, said means for imparting having parallel surfaces equal distantly spaced from each other in a substantially horizontal plane;

a plurality of finishing means positioned above said sludge bed for imparting to said liquid a continued lamellar flow and for removing from said liquid fine particles entrained therein, said finishing means comprising a plurality of elements having parallel surfaces equal distantly spaced from each other and inclined to the horizontal; and a plurality of collecting means parallelly arranged in a horizontal plane above said finishing means for collecting the treated liquid.

2. An apparatus for the decantation treatment of liquids, such as water, by passing said liquid upwardly through a sludge bed, said apparatus comprising:

a vessel having therein a lowermost treatment area for the treatment of said liquid, said treatment area having therein a sludge bed, a separating area immediately above said treating area for separating sludge from said liquid, and a decantation area immediately above said separating area;

a plurality of feed means parallelly arranged in a horizontal plane adjacent the bottom of said vessel for feeding said liquid to be treated into said treatment area and through said sludge bed;

a plurality of means positioned in said treatment area above said feed means for imparting to said liquid a uniform distribution and a lamellar flow upwardly through said sludge bed, said means for imparting having parallel surfaces equal distantly spaced from each other in a substantially horizontal plane;

a plurality of finishing means positioned in said decantation area for imparting to said liquid a continued lamellar flow and for removing from said liquid fine particles entrained therein, said finishing means comprising a plurality of elements having parallel surfaces equal distantly spaced from each other and inclined to the horizontal; and a plurality of collecting means parallelly arranged in a horizontal plane above said finishing means for collecting the treated liquid.

3. An apparatus as claimed in claim 2, wherein said means for imparting comprises a plurality of plane parallel plates.

4. An apparatus as claimed in claim 2, wherein said finishing means comprises a plurality of parallel plates having corrugated surfaces.

5. An apparatus as claimed in claim 2, wherein said finishing means comprises a plurality of parallelly mounted tubular elements.

6. An apparatus as claimed in claim 2, wherein said finishing means comprises a plurality of parallel plates inclined to the horizontal at an angle of from 30° to 70°.

7. A process for the decantation treatment of liquids, such as water, by passing said liquid upwardly through a sludge bed, said process comprising:
  passing liquid to be treated through horizontally and parallelly positioned feed means into a sludge bed arranged adjacent the bottom of a vessel, and allowing said liquid to pass through said sludge bed;
  passing said liquid between a plurality of parallel and horizontal elements positioned in said sludge bed above said feed means, thereby imparting a uniform distribution and a lamellar flow to said liquid upwardly through said sludge bed, said liquid being treated by said sludge bed;
  separating said treated liquid from said sludge bed by passing said liquid upwardly therefrom in said vessel;
  passing said treated and separated liquid further upwardly between a plurality of elements having parallel surfaces equal distantly spaced from each other and inclined to the horizontal, thereby imparting to said liquid a continued lamellar flow and removing from said liquid fine particles entrained therein; and
  and collecting the thus treated liquid.

References Cited
UNITED STATES PATENTS

| | | | |
|---|---|---|---|
| 3,635,346 | 1/1972 | Zuckerman et al. | 210—208 |
| 3,307,702 | 3/1967 | Mackrle et al. | 210—20 |
| 3,706,384 | 12/1972 | Weijman-Hane | 210—519 |
| 3,481,868 | 12/1969 | Gilwood et al. | 210—20 |

SAMIH N. ZAHARNA, Primary Examiner

B. CASTEL, Assistant Examiner

U.S. Cl. X.R.